United States Patent
Jimarez Howard

(10) Patent No.: US 12,251,045 B2
(45) Date of Patent: Mar. 18, 2025

(54) COLLAPSIBLE, MODULAR, INTERCHANGEABLE AND PORTABLE CAMPING GRILL

(71) Applicant: Mientras LLC, Ridgewood, NY (US)

(72) Inventor: Julian Armand Jimarez Howard, Ridgewood, NY (US)

(73) Assignee: Mientras LLC, Ridgewood, NY (US)

( * ) Notice: Subject to any disclaimer, the term of this patent is extended or adjusted under 35 U.S.C. 154(b) by 479 days.

(21) Appl. No.: 17/878,549

(22) Filed: Aug. 1, 2022

(65) Prior Publication Data
US 2024/0032729 A1    Feb. 1, 2024

(51) Int. Cl.
*A47J 37/07*    (2006.01)
*F24B 1/20*    (2006.01)

(52) U.S. Cl.
CPC ....... *A47J 37/0763* (2013.01); *A47J 37/0704* (2013.01); *F24B 1/205* (2013.01); *A47J 2037/0777* (2013.01)

(58) Field of Classification Search
CPC ................ A47J 37/0704; A47J 37/0763; A47J 2037/0777; F24B 1/205
See application file for complete search history.

(56) References Cited

U.S. PATENT DOCUMENTS

| 3,498,210 A | 3/1970 | O'Toole |
| 4,598,690 A | 7/1986 | Hsu |
| 9,402,509 B2 | 8/2016 | Robb |
| 9,657,950 B2 | 5/2017 | Boucher |
| D976,048 S * | 1/2023 | Sullivan ........................ D7/332 |
| D980,957 S * | 3/2023 | Hong ........................... D23/332 |
| 2007/0006863 A1 | 1/2007 | Barbarich |
| 2012/0204852 A1* | 8/2012 | Boucher .................. F24C 1/16 126/30 |
| 2019/0254477 A1* | 8/2019 | Skillman ............. A47J 37/0763 |
| 2021/0063017 A1 | 3/2021 | Poggi et al. |
| 2021/0177203 A1 | 6/2021 | Ngo |
| 2024/0418372 A1* | 12/2024 | Baird ........................ F24C 1/16 |

* cited by examiner

*Primary Examiner* — Alfred Basichas
(74) *Attorney, Agent, or Firm* — Nicholas P. Chiara; Chiara IP Law PLLC

(57) ABSTRACT

A collapsible, portable, and modular grill employing biomass fuel that can be prepared from two to seven components into multiple configurations for cooking and heating, and wherein all of the components are generally flat metal plates that can be packed into a single flat container that is moderately larger than the length and width of the largest flat component, and the container is high enough to fit up to seven components stacked or laid flat on top of each other.

20 Claims, 14 Drawing Sheets

COLLAPSIBLE, MODULAR, INTERCHANGEABLE AND PORTABLE CAMPING GRILL

FIELD OF THE ART

The present invention relates to the field of portable natural fuel outdoor cooking and/or heating devices. More particularly, the present invention relates to portable, lightweight, collapsible, interchangeable and modular outdoor grills for cooking and/or heating. The present invention provides a novel and unique system that is capable of being arranged in multiple configurations to accommodate various needs and utilities.

BACKGROUND ART

Humans have been employing various options for cooking and heating needs since the dawn of time. The traditional campfire has often consisted of a series of rocks in a circular formation surrounding a pit for wood or other readily available biomass to provide fuel for the fire. Modern cooking and/or heating devices often use propane, butane, or alcohol-fueled systems. While many modern-day devices are compact and lightweight, at least compared to earlier outdoor devices, they still require the use of fuel containers that need to be maintained, filled and transported for use with the device. Further, most current devices are only usable in a single predetermined shape/mode. To accommodate multiple needs and/or uses the outdoor enthusiast would need multiple devices. This adds considerable cost in time, money, storage space and difficulty of use compared to traditional biomass fuel systems.

The use of biomass as the fuel allows the user to employ various items as the fuel source. Examples include, but are not limited to logs, twigs, sticks, tree bark, leaves, firewood, paper products, composite materials, fabric, and/or charcoal. A further advantage of employing biomass as the fuel is the reduced carbon emissions as compared to pre-packaged carbon containing fuel containers. Biomass stoves that are capable of achieving sufficient burn times and elevated temperatures provide more efficient heat transfer than traditional open pit campfires. Additionally, by opting for a biomass burning system in many outdoor recreation areas, enthusiasts are able to gather material directly at their site further increasing their carry capacity and/or reducing the weight of their equipment.

Many of the known outdoor cooking and/or heating devices suffer from issues relating to weight, storage size, limited fuel, lack of customization, cost and overall utility. Examples include U.S. Pat. Nos. 3,498,210; 4,598,690; 9,402,509; 9,657,950; and U.S. Pub. App. Nos. 2007/0006863; 2021/063017; and 2021/0177203.

U.S. Pat. No. 3,498,210 discloses a portable outdoor grill that can be broken down into separate components and assembled at the camping site using a pole or stake for support. The grill has a generally V-shaped fire box over which a grate can be placed for cooking food. This device lacks the interchangeability and overall portability of the present invention. Additionally, the use of this device requires that surface upon which it sits be easily penetrated. In a situation with a rocky ground surface, or other impenetrable surface, it can be very difficult, to impossible, to drive a stake into the ground. Alternatively, a highly sandy or low-density surface may not provide the strength necessary to hold the device.

U.S. Pat. No. 4,598,690 discloses a collapsible grill that can be folded up into a suitcase for transport and storage. This device lacks the interchangeability and adaptability of the present invention. Further, this device relies on multiple mechanical hinges and structural elements that require heightened levels of manufacturing and assembly in comparison to the present invention.

U.S. Pat. No. 9,402,509 discloses a box shaped grill device with a single overall structure. The box grill encloses the fire to eliminate sparks and fire escaping, and allows for wood to be added to the firebox without removing the cooking surface. This device is substantially less portable, has less adaptability than the present invention. Additionally, the hinges on this device are difficult to clean and can act as points of failure when the metal expands and contracts with temperature fluctuations.

U.S. Pat. No. 9,657,950 discloses a plate system for arranging an outdoor grill. This device is portable, collapsible and can be arranged in multiple configurations. However, this device is less flexible than the present invention, and more difficult to manufacture and assemble. Additionally, this device is less adaptable for larger fires, provides deficient airflow to the firebox, and lacks adaptability for multiple cooking scenarios.

U.S. Pub. App. No. 2007/0006863A1 discloses a portable collapsible outdoor grill with a single cooking arrangement. This device relies on mechanical hinges to allow it to collapse and to be locked into its cooking structure. Hinges are common points of failure due to the expansion and contraction of the metal in a device designed for cooking and heating. This makes this device more difficult to clean, more prone to failure, and harder to repair than the present invention.

U.S. Pub. App. No. 2021/0063017A1 discloses a plate system for preparing a standing outdoor grill. The device is collapsible and generally portable in its non-natural gas version. Unfortunately, this device lacks the interchangeability and adaptability of the present invention. It is limited in size, and provides poor airflow to the firebox. While the device has optional features that provide some adaptability, these features increase the space, decrease the portability and reduce the ease of use of the device.

U.S. Pat. App. No. 2021/0177203A1 also discloses a plate system for a collapsible and portable outdoor grill. Similar to other prior art devices, this model is only capable of forming a single structure with limited use, limited adaptability, and poor airflow. Further, this device relies on mechanical hinges that act as failure points for portable devices.

Of particular relevance to the present invention, the prior art devices are often constrained by their lack of versatility. In particular the devices are constructed in a set manner to be employed in a single configuration with a single fuel source. This lack of optionality limits not just the uses of the grill, but the amount of people that the device can serve, the weather conditions in which the device will be used, the available storage space for each trip/event, and the weight limits or desires for each trip/event. If the outdoor enthusiast is constrained by single functionality of a device the individual will need multiple devices to serve their cooking/heating needs leading to increased space, weight, cost and time drains on what should be an enjoyable outdoor event. Further, many of these prior art devices rely on the use of hinges which can be impractical in an outdoor setting because of their susceptibility to failure from heat, dirt, and ash, all of which are present in abundance.

SUMMARY OF THE INVENTION

The present invention provides a collapsible, modular, interchangeable, portable and easy to use outdoor grill that can be used as a cooking and/or heating device. The novel features of the highly adaptable device provide a lightweight, collapsible, modular, interchangeable and easy to use outdoor grill.

The present invention provides additional ease of use benefits due to its use of readily available biomass as its fuel source. The present invention overcomes many of the shortfalls of prior art devices because it does not require electrical starters, fuel canisters, pre-packaged fuel sources, or specific starting materials. Additionally, the novel inclusion of an elevated ash plate and perforated plate protects the surface beneath the fire from scorching and falling hot coals, while providing superior air flow dynamics. Further, the slotted side panels allow for easy ash disposal and quick disassembly. The ability to completely separate the panels allows for superior cleaning of the device, particularly when compared to a fully assembled device that is intended to remain assembled, and/or is difficult to disassemble.

In one embodiment of the present invention the grill is configured with seven component pieces. These seven component pieces form the core of the grill that can then be re-configured in multiple arrangements based on the needs of the user. The primary formation comprises two long-side panels, two short-side panels, an ash plate, a perforated plate (the ash plate and perforated plate both being bottom plates), and a grill plate. The dimensions of the two long-side panels are equal, and the dimensions of the two short-side panels are equal. The core (not including tabs or handles) of the ash plate, the perforated plate, and the grill plate are generally constructed to be approximately equal in width and length.

The long-side panels each include at least four tabs (at least two on each short side of the long-side panels) extending lengthwise from the vertical edges (short side of the long-side panel) of the long-side panels. The long-side panels further include at least two rows of long-side panel slots designed and configured to engage the bottom plates. The long-side panels include a plurality of long-side panel slots in each row.

The short-side panels also include at least four tabs (at least two on each short side of the short-side panels) extending lengthwise from the vertical edges (short side of the short-side panels) of the short-side panels. The short-side panels further include at least two grill plate tabs extending vertically and lengthwise from the horizontal upper edge (when in the upright constructed configuration) of the short-side panels to engage the grilling plate. The long-side panel tabs are configured to engage and interlock with the short-side panel tabs.

The bottom plates are designed to include at least four bottom plate tabs (at least two on each long side) extending laterally from each plate. Two variations of the bottom plate are the ash plate and the perforated plate. The long-side panel includes horizontal slots, long-side panel slots, in the surface of the long-side panel designed and configured to receive the tabs from the bottom plate(s) (e.g., the ash plate and/or the perforated plate).

The components of the present invention are configured and designed to be generally flat metal plates that can be stacked on top of one another. The components can be bound or packed into a container that is slightly larger than the longest long side length and the longest short side length of the components. The height of the container must be higher than the total width of the flat plates stacked on top of each other. In an embodiment where the plates are approximately 1.5 mm in width and the embodiment includes 7 plates, the height of the container would need to be at least 11 mm high. In certain embodiments, two short-side panels can be laid next to each other on top of a single long-side panel, reducing the required height of the container by 1.5 mm. In certain embodiments the grill comprising the long-side panels, short-side panels, grill plate and bottom plates (collectively the panels and plates) are configured to be disassembled, stacked flat, and stored in a container that is larger in its interior volume than the combined length of the grill plate inclusive of its handles, and wider than the bottom plates inclusive of their tabs, such that the container forms an enclosure that is 1-30% longer than the total length of the grill plate (inclusive of the handles), 1-30% wider than the short side length of a bottom plate (inclusive of the tabs), and 500-2000% higher than the width of any one plate or panel. In preferred embodiments the container is 5-20% longer than the length of the grill plate (inclusive of the handles), 5-20% wider than the short side length of a bottom plate (inclusive of the tabs), and the height is 800-1200% higher than the width of any one plate or panel. In a most preferred embodiments the container is 10-15% longer than the length of the grill plate (inclusive of the handles) (most preferred length is 381 mm), 10-15% wider than the short side length of a bottom plate (inclusive of the tabs) (most preferred length is 220 mm), and the height is 900-1000% higher than the width of any one plate or panel (the preferred width is 1.5 mm).

The primary embodiment of the grill is a generally rectangular box with two short-side panels opposite and parallel to each other and in vertical alignment, wherein the short-side panels are interlocked with two long-side panels opposite and parallel to each other and in vertical alignment, forming a four-sided box with no top or bottom. The bottom plate(s) (ash plate and/or perforated plate) is in a horizontal position, perpendicular to the short-side panel and long-side panel, interlocked with the long-side plates via the tabs on the bottom plate(s) (ash plate and/or perforated plate) interlocked and engaged with the long-side slots in the surface of the long-sided panels, forming a five-sided box with one or two bottom layers. The five-sided box forms an interior fuel compartment designed to hold fuel for the grill. The fuel compartment can be located above the ash plate, or above the perforated plate when the perforated plate is located above the ash plate. Alternatively, the fuel compartment is located above the perforated plate and no ash plate is employed. In an alternative embodiment, no bottom plate is employed and the fuel compartment is defined by the four vertical sides of the grill and the ground.

The grill plate is placed in a horizontal position, perpendicular to the short-side panels and long-side panels, on top of the generally rectangular box formed from the short-side panels and the long-side panels, and bottom plate(s) (ash plate/perforated plate), completing the six-sided box. In at least one embodiment, the grill plate will include grill plate holes that can receive grill plate tabs from the upper horizontal edges of the short-side panels (long side edge of the short-side panel in the upright configuration). In an alternate embodiment the grill plate can rest on top of the generally rectangular box construction of the primary embodiment. The holes in the grill plate are located towards the short-side edge of the grill plate putting them in alignment with the upper horizontal edge of the short-side panel when the grill is assembled in the primary embodiment. The grill plate further includes grill plate handles and a plurality of grill plate slots.

Alternate configurations of the present invention will be described below in further detail. The size, thickness and shape of the panels can be varied depending on the overall desired size and configuration of the grill, however to maintain the modularity and interchangeability, the size and shape of the plates will need to be maintained within certain ratios.

The following dimensions of the components of the present invention will be provided with reference to the configuration of the components assembled in the primary embodiment. The short side (vertical height) of the long-side panel in relation to the short side (vertical height) of the short-side panel is equal, to approximately equal in length (excluding the grill plate tabs on the short-side panel to accommodate the grill plate). The long side of the long-side panel (excluding tabs), the long side of the bottom plates (ash plate and perforated plate), and long side of the grill plate (excluding the grill plate handles) are equal, to approximately equal in length. In certain embodiments the grill plate (excluding the grill plate handles) is approximately, 2-10% larger than the bottom plates. The long side of the short-side panel (excluding tabs), the short side of the bottom plates (excluding tabs), and the short side of the grill plate are equal, to approximately equal in length.

Further, the long side of the long-side panel (excluding tabs), the long side of the bottom plates (ash plate and perforated plate), and long side of the grill plate (excluding the grill plate handles) relative to the long side of the short-side panel (excluding tabs), the short side of the bottom plates (excluding tabs), and the short side of the grill plate is in, preferably between 1:1-3:1, with a preferred ratio of 3:2 (excluding the tabs of each panel). The total length (inclusive of tabs) of the long-side of the long-side panel is double the length (vertical height) of the short-side of the short-side panel (excluding the grill plate tabs) and the short-side of the long-side panel, or in a ratio between 1:1 and 4:1, with a preferred ratio of 2:1.

The preceding dimensions allow for two short-side panels to be laid next to each other and stacked above one long-side panel when the components are stored in a container for transport or storage.

The preceding ratios and dimensions ensure that the component parts can be scaled up or down, while allowing the components to properly engage to form the grill configurations of the present invention. Further, the preceding ratios and dimensions ensure that the component will be capable of being stacked on top of each other in a stable and compact fashion. The preferred sizes and dimensions have been configured and designed in view of multiple factors including, but not limited to: the average sizes of firewood; the internal height capacity of many recreational backpacks (where the grill can provide additional back support); common dimensions for tote style shoulder bags; the dimensions of common barbeque food items (e.g., steaks, sausages, eggplants, onions, etc.); average human hand sizes for men and women; the space under car seats, as well as common cargo areas in vehicle trunks; the average surface area of picnic table tops, as well as the average surface area of common patio tables; and common heights for couch and bed legs, as well as average cabinet drawer dimensions, to allow storage at home when not in use (a common constraints that larger fixed type grills often neglect). The preferred embodiment balances a conveniently large cooking/heating surface area with portability and storage in novel ways for consumers.

Additionally, the number, location, and size of the tabs and slots configured for interlocking and engaging of the panels can be varied based on the overall size and shape desired for the various configurations of the device.

The panels may include opening, holes, slots, perforations, airholes, and/or combinations thereof, depending on the desired airflow, heat flow, biomass movement, ash flow, or artistic design for the grill of the present invention.

In certain embodiments the grill will be prepared from stainless steel, titanium or high temperature resistant metals. Alternate materials that are suitable for a grill may be employed. Further, the device may be prepared from multiple different materials either for different components of the device or for different portions of each component. Additionally, the component panels can be made from a single material or multiple materials.

While the primary embodiment allows for a perforated base on which the biomass fuel will be located during operation, and an ash plate to collect the used biomass fuel, alternate configurations of the present invention can be constructed without the ash plate and/or the perforated plate. Additionally, if only heat is required from the device, the grill plate can be removed as well.

The primary embodiment, as well as additional embodiments, may also be employed purely for aesthetic beauty. Individuals may simply want to be able to view and enjoy a beautiful fire without regard for the warmth or cooking functions. The decorative side patterns shown in preferred embodiments of the present invention further enhance the aesthetic qualities of the present device.

Further embodiments can remove one short-side panel, one long-side panel, or one long-side panel and one short-side panel to create a windscreen for a traditional pit fire or an alternate grill.

Additional embodiments of the present invention will comprise short-side panels that include diagonal slots designed for receiving the tabs of the long-side panels. This will allow for an alternate V-configuration (or V-shaped configuration) of the grill. The V-configuration does not require a bottom plate (i.e., the ash plate or the perforated plate). The V-configuration will be lighter and easier to transport due to the lack of at least two components. However, it should be noted that the V-configuration has smaller volume for biomass containment (fuel compartment) and will have a decreased airflow in comparison to a formation that employs the perforated plate.

In one embodiment of the V-configuration, the grill plate can rest on top of the grill. In an alternate embodiment, a bottom plate, such as the ash plate, can be placed on top of the grill and be used as a solid cooking surface. Alternatively, the grill can be used without a top component either solely for heat or with a cooking utensil, such as a pan placed across the open V-configuration and resting on the upper horizontal edges (long sides of the long-side panels) of the inverted long-side panels. FIG. 11.

Embodiments of the present invention include:
A collapsible, portable, and modular grill comprising:
(a) two long-side panels, wherein the long-side panels comprise a long side and a short side, wherein the long-side panels further comprise long-side panel tabs and a plurality of long-side panel slots, wherein the long-side panel tabs extend lengthwise from the short side of the long-side panels;

(b) two short-side panels, wherein the short-side panels comprise a long side and a short side, wherein the short-side panels further comprise short-side panel tabs, diagonal short-side panel slots and grill plate tabs, wherein the short-side panel tabs extend lengthwise from the short side of the short-side panels, and the grill plate tabs extend lengthwise from an edge of the long side of the short-side panels;

(c) a bottom plate, wherein the bottom plate comprises a short side and a long side, wherein the bottom plate comprises bottom plate tabs configured to engage with the long-side panel slots, and wherein the bottom plate tabs extend lengthwise from the long side of the bottom plate; and (d) a grill plate, wherein the grill plate comprises a long side and a short side, wherein the grill plate comprises a plurality of grill slots, and grill plate holes;

wherein the two long-side panels and the two short-side panels are configured to be engaged via the long-side panel tabs and the short-side panel tabs to form a four-sided box;

wherein the bottom plate is configured to be engaged with the long-side panels via the bottom plate tabs and the long-side panel slots to form a five-sided box;

wherein the five-sided box comprises a fuel compartment configured to hold fuel for the grill; and wherein the grill plate is configured to be engaged with the long side of the short-side panels via engagement of the grill plate holes on the grill plates and the grill plates tabs on the edge of the long side of the short-side panels to form a six-sided box.

A collapsible, portable, and modular grill comprising:

(a) two long-side panels, wherein the long-side panels comprise a long side and a short side, wherein the long side panels further comprise long-side panel tabs and a plurality of long-side panel slots, wherein the long-side panel tabs extend lengthwise from the short side of the long-side panels; and (b) two short-side panels, wherein the short-side panels comprise a long side and a short side, wherein the short-side panels further comprise short-side panel tabs, diagonal short-side panel slots and grill plate tabs, wherein the short-side panel tabs extend lengthwise from the short side of the short-side panels, the grill plate tabs extend lengthwise from an edge of the long side of the short-side panels, wherein the long-side panels and the short-side panels are configured to be engaged via the long-side panel tabs and the diagonal short-side panel slots to form a V configuration; wherein the short-side panels are parallel to each other in a vertical alignment and the long-side panels form a V configuration at an angle of 70-110 degrees.

A collapsible, portable, and modular grill comprising:

(a) a long-side panel, wherein the long-side panel comprise a long side and a short side, wherein the long side panel further comprises long-side panel tabs and a plurality of long-side panel slots, wherein the long-side panel tabs extend lengthwise from the short side of the long-side panel; and (b) a short-side panel, wherein the short-side panel comprises a long side and a short side, wherein the short-side panel further comprises short-side panel tabs, diagonal short-side panel slots and grill plate tabs, wherein the short-side panel tabs extend lengthwise from the short side of the short-side panel, and the grill plate tabs extend lengthwise from an edge of the long side of the short-side panel; wherein the long-side panel is configured to engage the short-side panel via the long-side panel tabs and the short-side panel tabs to form a two-sided windscreen.

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Figure 1:
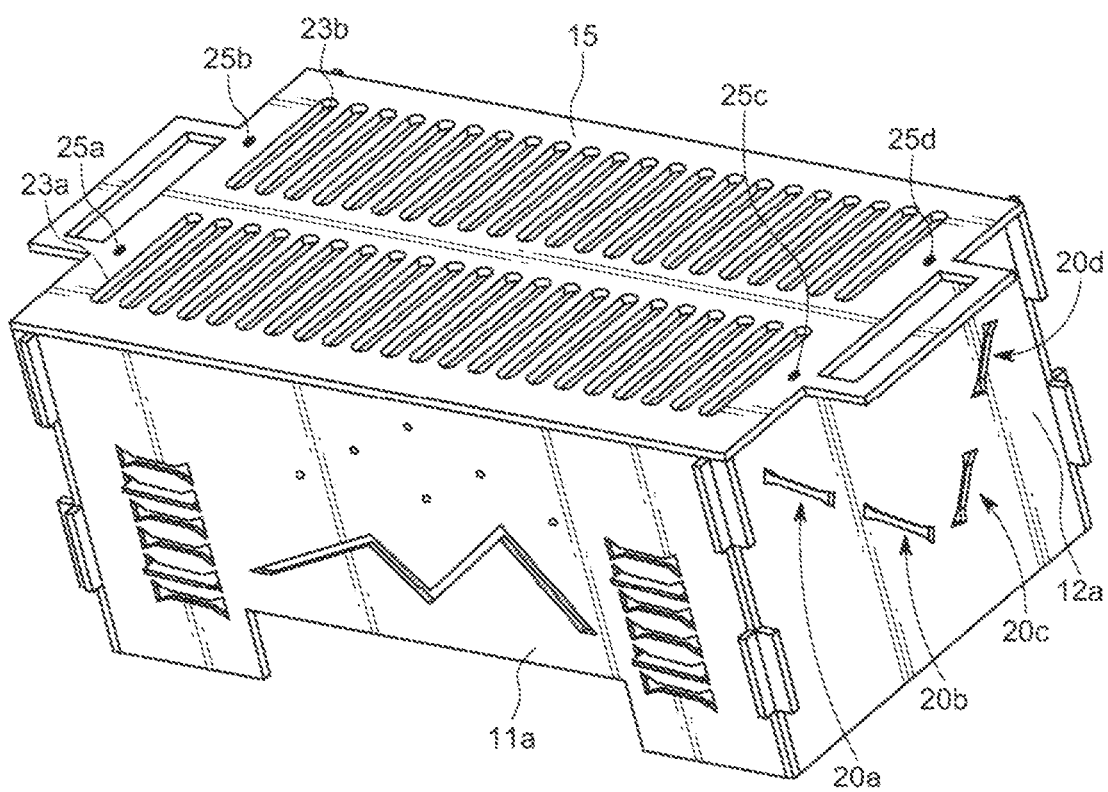
FIG. 1 is a perspective view of the primary embodiment of the grill of the present invention.
Figure 2:
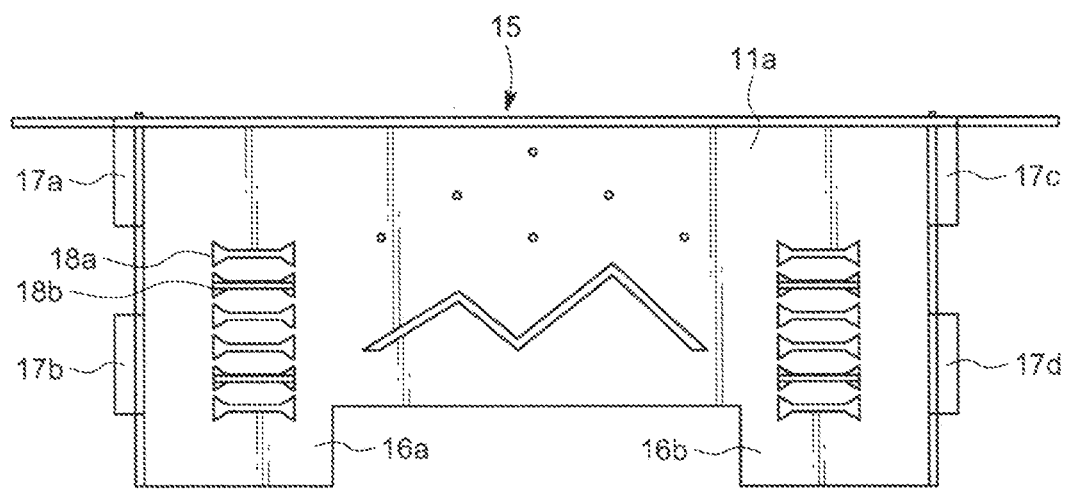
FIG. 2 is a front view of the primary embodiment of the grill of the present invention
Figure 3:
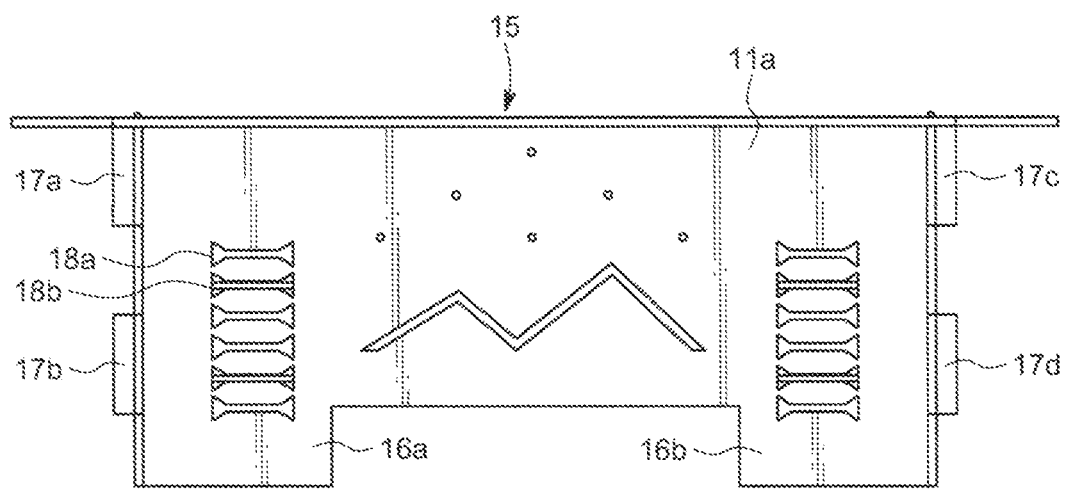
FIG. 3 is a rear view of the primary embodiment of the grill of the present invention
Figure 4:
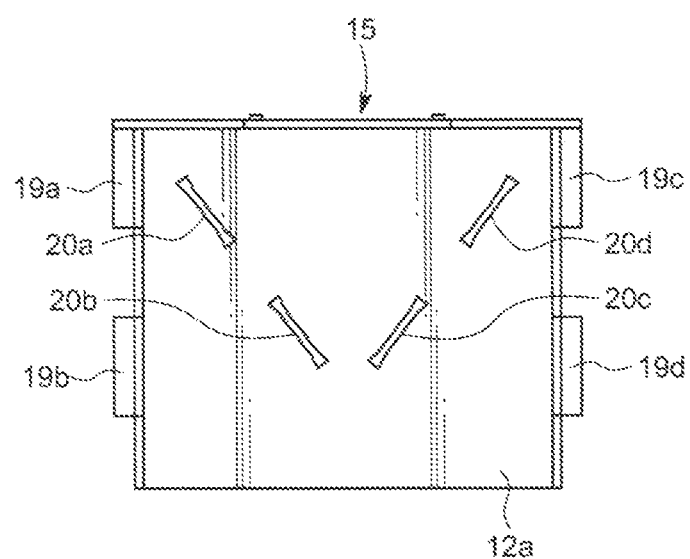
FIG. 4 is a right-side view of the primary embodiment of the grill of the present invention.
Figure 5:
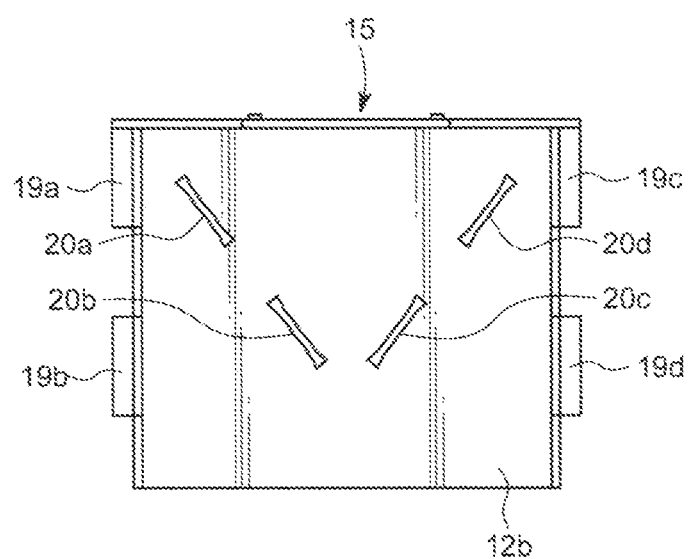
FIG. 5 is a left-side view of the primary embodiment of the grill of the present invention.
Figure 6:
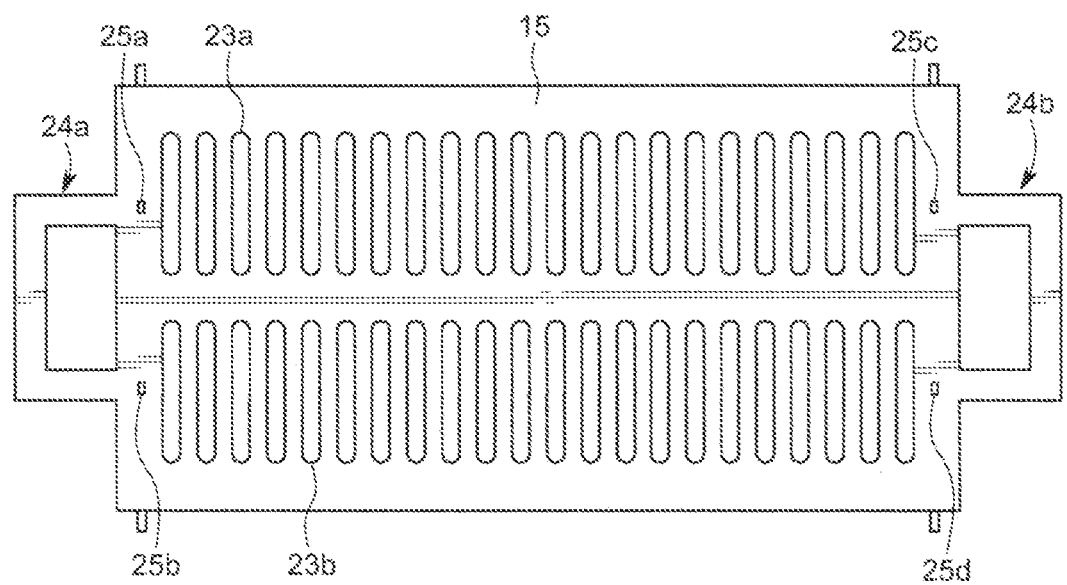
FIG. 6 is a top view of the primary embodiment of the grill of the present invention.
Figure 7:
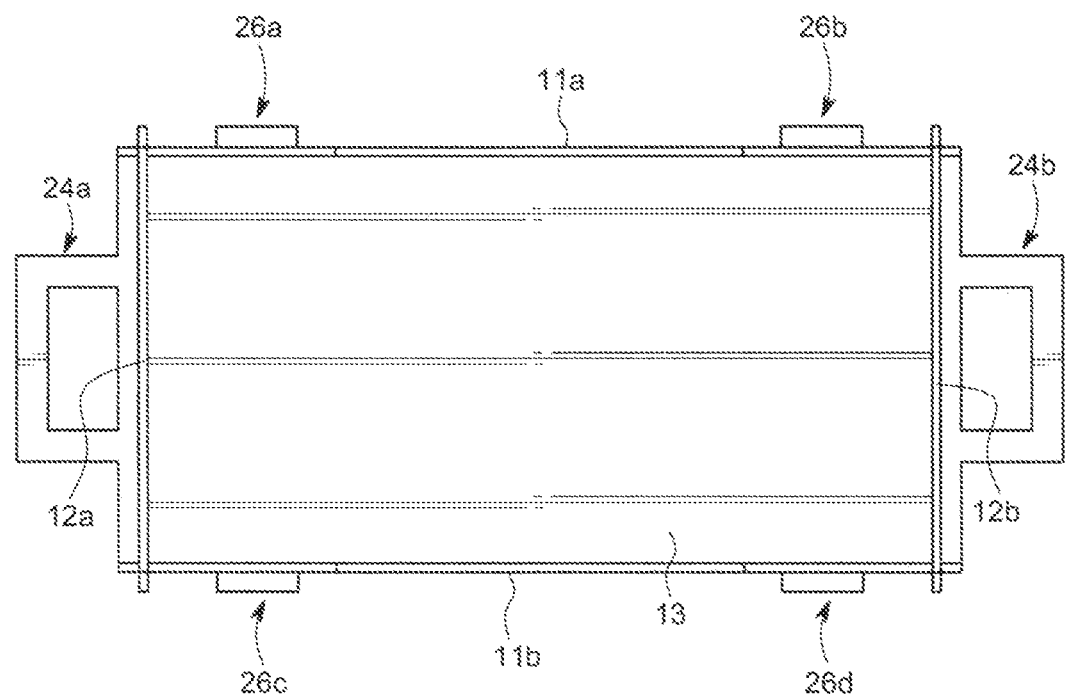
FIG. 7 is a bottom view of the primary embodiment of the grill of the present invention.

FIG. 1 is an embodiment of the primary configuration 10 of the grill of the present invention. The primary configuration 10 includes seven components: two long-sided panels 11a, 11b; two short-sided panels 12a, 12b; an ash plate 13; a perforated plate 14; and a grill plate 15. The grill 10 in FIG. 1 is in the upright configuration. When components are described by vertical height or horizontal length in the present application these designations refer to the components in the upright configuration illustrated in FIG. 1.

The long-side panels 11a, 11b are generally flat rectangular panels with a long side (horizontal length) and a short side (vertical height). The short side of the long-side panels 11a, 11b further include feet 16a, 16b that extend in a vertical direction downward towards the bottom of the short side of the long-side panels 11a, 11b. The long-side panels 11a, 11b include four U-shaped tabs 17a, 17b, 17c, 17d that extend lengthwise from the short side vertical edges of the long-side panels, with two of the U-shaped tabs on each short side vertical edge of the long-side panel. The U-shaped tabs on each vertical edge extend approximately a quarter of the length of the vertical edge of the long-side panels 11a, 11b. The long-side panels 11a, 11b further include two sets of six horizontal long-side panel slots 18a, 18b in the surface of the long-side panels 11a, 11b. The long-side panel slots 18a, 18b are aligned in parallel vertical rows, wherein each row is located between the vertical edge or short side of the long-side panels 11a, 11b and the vertical edge of the feet 16a, 16b of the long-side panel. The lowest long-side panel slot is aligned with the upper corner of the feet 16a, 16b. The surface of the long-side panels 11a, 11b further include decorative openings or holes 22 that allow for increased airflow to the biomass in the fuel compartment during combustion and burning. (FIGS. 1-9).

The short-side panels 12a, 12b are generally rectangular, but are shorter in horizontal length than the horizontal length (long side) of the long-side panels 11a, 11b. The short-side panels 12a, 12b include four U-shaped tabs 19a, 19b, 19c, 19d. There are two U-shaped tabs on each vertical edge (short side) of the short-side panels 12a, 12b, that extend lengthwise from the short side edges of the short-side panels. The short-side panel U-shaped tabs 19a, 19b, 19c, 19d are designed and configured to engage and interlock with the long-side panel U-shaped tabs 17a, 17b, 17c, 17d allowing the primary configuration of the grill 10 to form a four-sided box formation without a top or bottom. The short-side panels 12a, 12b further include four short-side panel diagonal slots 20a, 20b, 20c, 20d in the surface of the short side-panels 12a, 12b. The length and width of the four short-side panel diagonal slots 20a, 20b, 20c, 20d is slightly larger than the length and width of the long-side U-shaped tabs 17a, 17b, 17c, 17d, allowing these tabs to be inserted when the grill is in the V-configuration (Example 2).

Figure 8:
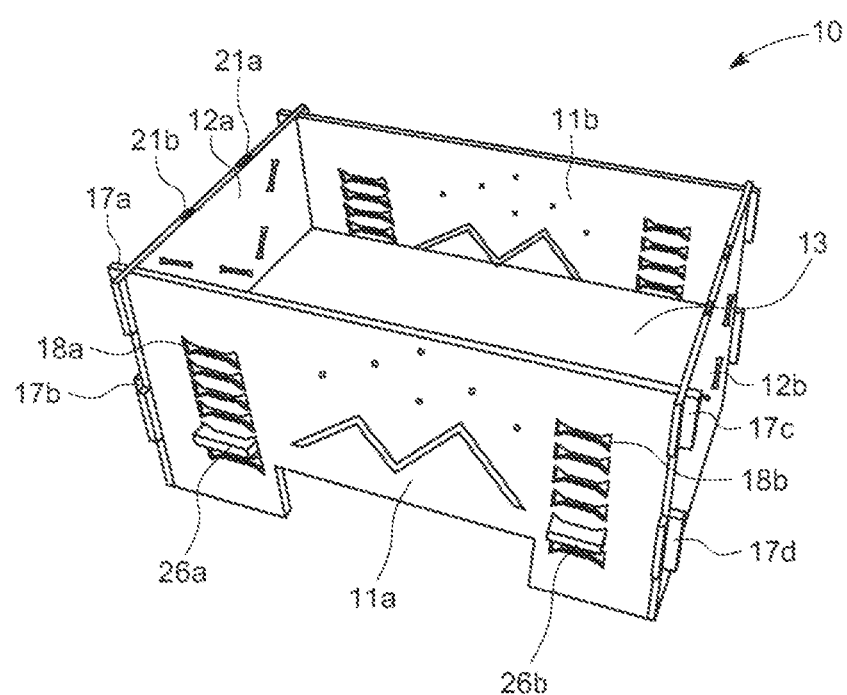
FIG. 8 is an alternate view of the primary configuration of the grill of the present invention.
Figure 9:
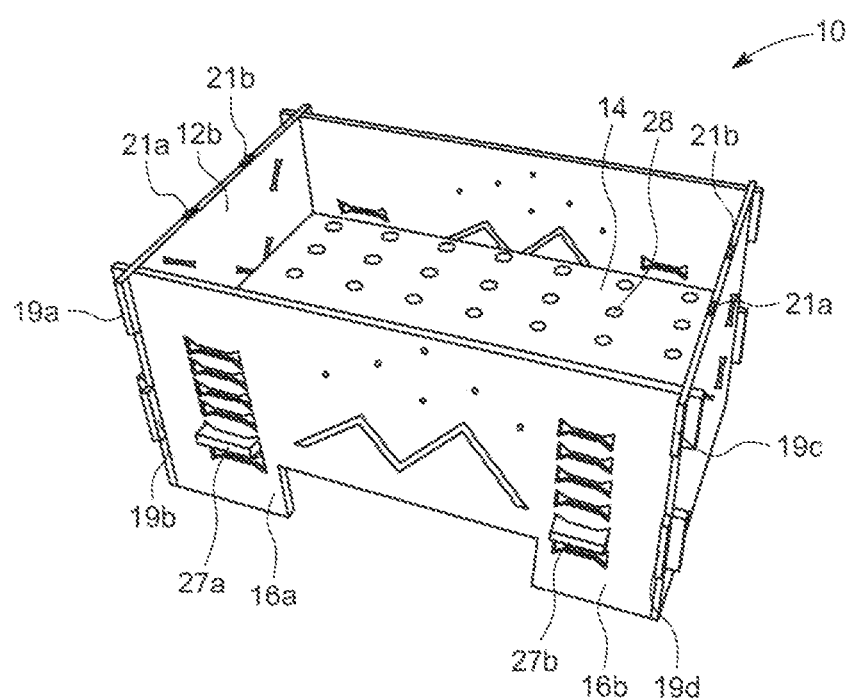
FIG. 9 is an alternate view of the primary configuration of the grill of the present invention.

The short-side panels 12a, 12b further include grill-plate tabs 21a, 21b that extend vertically (lengthwise) from the upper horizontal edge (upper long side) of the short-side panels 12a, 12b. The grill-plate tabs 21a, 21b engage with grill plate holes 25a, 25b, 25c, 25d in the surface of the grill plate 15. (FIGS. 1, 8 and 9)

Figure 13:
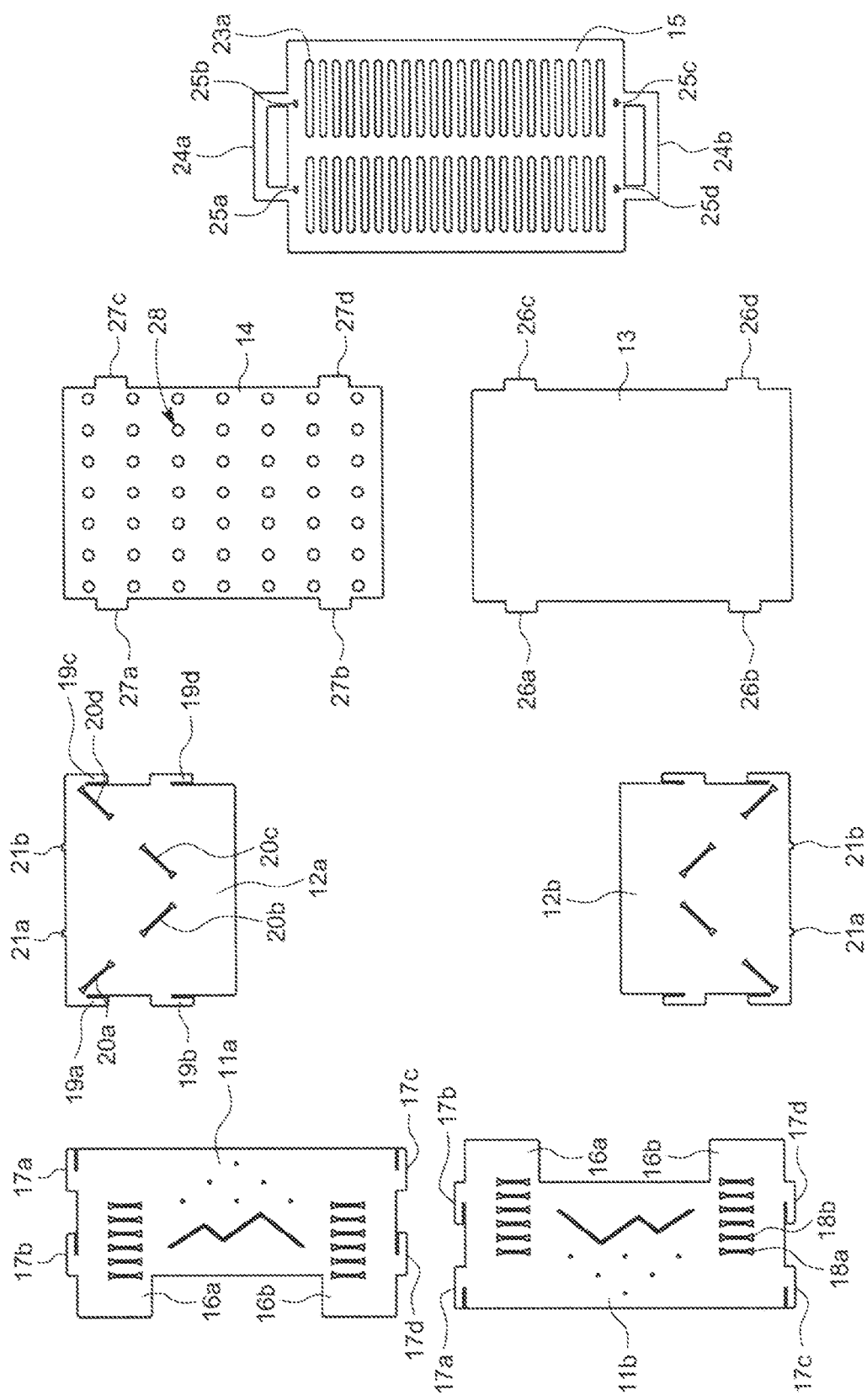
FIG. 13 is an exploded view of the components of the present invention.

The grill plate 15 is generally a flat rectangular panel with a long side and a short side. The grill plate 15 includes two rows of a plurality of grill slots 23a, 23b forming the grill surface that run perpendicular to the long side of the grill plate 15. The grill plate 15 further includes two handles 24a, 24b that extend lengthwise from the short side edge of the grill plate 15. A first grill plate handle 24a extends from a short side edge of the grill plate 15 and the second grill plate handle 24b extends from the opposite short side edge of the grill plate 15. The grill plate 15 includes two sets of grill plate holes 25a, 25b and 25c, 25d in the surface of the gill plate 15. Two grill plate holes 25a, 25b are located near one short side of the grill plate 15, and two grill plate holes 25b, 25c are located near the opposite short side of the grill plate 15. (FIG. 13). The grill plate 15 attaches firmly to the grill in the primary configuration 10 by inserting the two sets of grill-plate tabs 21a, 21b into the grill plate holes 25a, 25b, 25c, 25d in the surface of the grill plate 15. (FIGS. 1 and 13).

The ash plate 13 is a generally rectangular flat plate with a long side and a short side. The edge of the long side the ash plate 13 includes two ash plate tabs 26a, 26b, 26c, 26d (two tabs on each side of the plate) extending lengthwise from the ash plate 13. The ash plate tabs 26a, 26b, 26c, 26d are smaller than the width and length of long-side panel slots 18a, 18b. This allows the ash plate tabs 26a, 26b, 26c, 26d to be inserted into the long-side panel slots 18a, 18b of the long-side panels 11a, 11b. The length of the long side (length) of the ash plate 13 is approximately equal to the length of the long side (horizontal length) of the long-side panel 11a, 11b, and the length of the short side (horizontal width) of the ash plate 13 is approximately equal to the length (horizontal length) of the long side of the short-side panel 12a, 12b. (FIGS. 8 and 13).

The perforated plate 14 is a generally rectangular flat plate with a long side and a short side. The edge of long side of the perforated plate 14 include two perforated plate tabs 27a, 27b, 27c, 27d (two tabs on each side of the plate) extending lengthwise from the perforated plate 14. The perforated plate tabs 27a, 27b, 27c, 27d are smaller than the width and length of long-side panel slots 18a, 18b. This allows the perforated plate tabs 27a, 27b, 27c, 27d to be inserted into the long-side panel slots 18a, 18b of the long-side panels 11a, 11b. The length of the long side (horizontal length) of the perforated plate 14 is approximately equal to the length of the long side (horizontal length) of the long-side panel 11a, 11b (not including tabs), and the length of the short side (horizontal width) of the perforated plate 14 is approximately equal to the length of the long side (horizontal length) of the short-side panel 12a, 12b. The ash plate 13 and perforated plate 14 are equal, to approximately equal, in size. The perforated plate 14 further includes a plurality of ash holes 28 formed in the surface of the perforated plate 14. In one embodiment, the perforated plate 14 includes forty-nine ash holes 28 equally spaced across the surface of the perforated plate 14. (FIGS. 9 and 13). The ash holes 28 can be randomly distributed across the surface of the perforated plate 14.

In preferred embodiments, the dimensions of the two long-side panels are approximately 160 mm×320 mm×1.5 mm (height, length and width, in upright configuration). The dimensions of the two short-side panels are approximately 163 mm×220 mm×1.5 mm (height, length and width, in upright configuration). In preferred embodiments, the core (not including tabs, or grill handles) of the ash plate, the perforated plate, and the grill plate are constructed to be approximately equal in width and length, approximately 300 mm×200 mm. In certain embodiments, the grill plate is approximately 2 to 10% longer on the long side than the bottom plates, or 317 mm×200 mm.

In the primary embodiment of the grill 10 the perforated plate 14 is placed above the ash plate 13. Depending on the amount of biomass, the ground surface the grill 10 is placed on, the desired airflow, and other parameters determined by the user, the perforated plate 14 and ash plate 13 can be set at varying heights by using different long-side panel slots 18a, 18b. (FIGS. 1-9 and 13).

Figure 10:
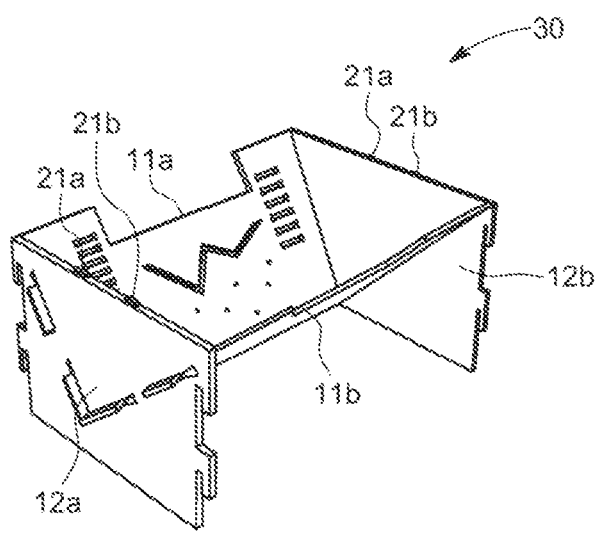
FIG. 10 is a view of the V-configuration of the grill of the present invention.

FIG. 10 is an embodiment of the present invention in the grill in the V-configuration 30. The grill in the V-configuration 30 employs either four or five components. The four main components of the grill in the V-configuration 30 are the two short-side panels 12a, 12b and the two long-side panels 11a, 11b. The optional fifth component of the grill in the V-configuration 30 is either the grill plate 15 or the ash plate 13. (FIGS. 10, 11, 12 and 14). In the grill in the V-configuration 30 the long-side panels 11a, 11b form a wedge at an angle of 70 to 100 degrees, more preferably 80 to 90 degrees, and most preferably 86 degrees.

Figure 11:
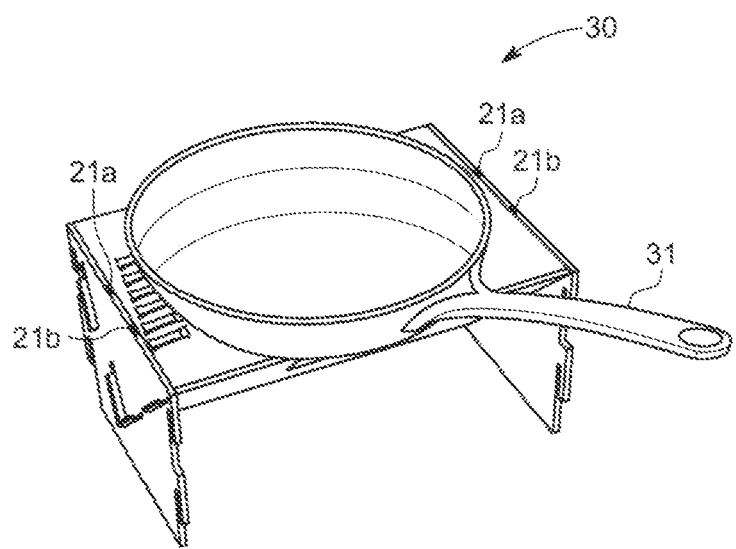
FIG. 11 is an alternate view of the V-configuration of the grill of the present invention.

In the grill in the V-configuration 30 the long-side panels 11a, 11b are held at angles between the short-side panels 12a, 12b. The long-side U-shaped tabs 17a, 17b, 17c, 17d are inserted into the four short-side panel diagonal slots 20a, 20b, 20c, 20d. The long-side U-shaped tabs 17a, 17b, 17c, 17d are configured to fit or slot through the short-side panel diagonal slots 20a, 20b, 20c, 20d and then engage and lock in place via the long-side U-shaped tabs 17a, 17b, 17c, 17d being pulled diagonally down into a lower position via gravity or user motion. The grill can be used in a V-configuration 30 with an additional plate, e.g., the grill plate 15 or the ash plate 13, or as a heating device without any additional plate. Alternatively, an optional cooking utensil, such as a large pan or skillet 31, can be placed between the upper vertical edges of the long-side panels 11a, 11b (the inverted bottom vertical edge of the long-side panel in the primary configuration). (FIG. 11).

Figure 14:
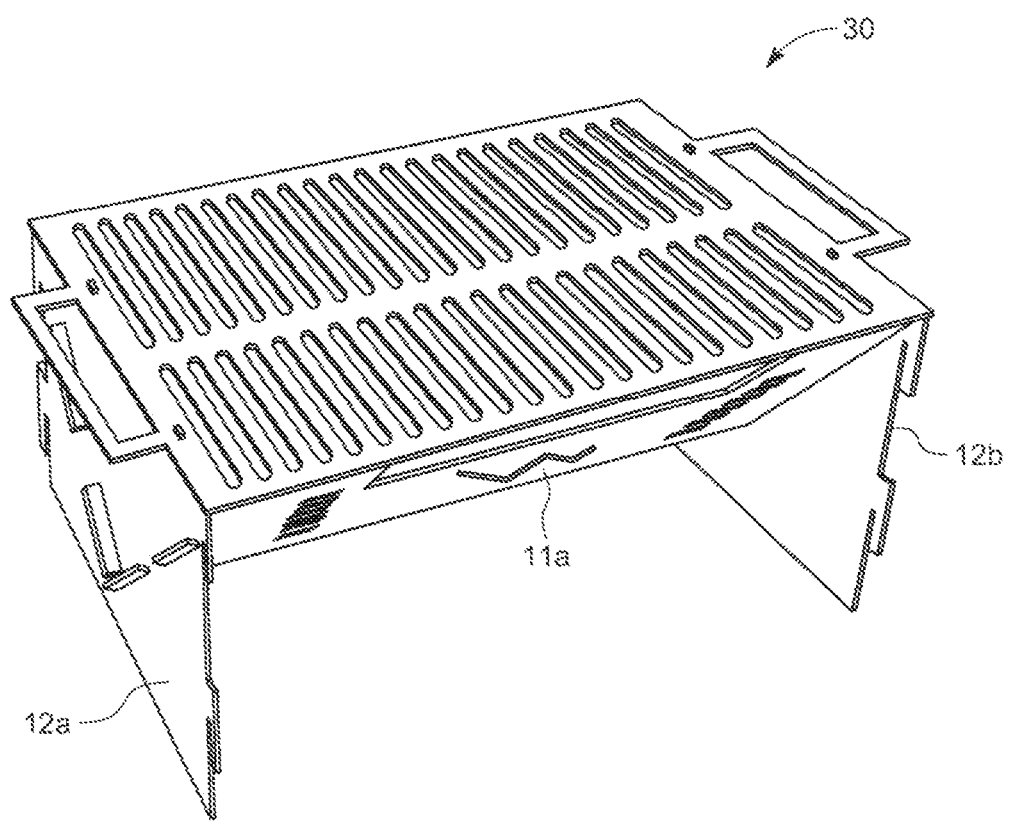
FIG. 14 is an alternate view of the V-configuration of the grill of the present invention.

Alternatively, the grill plate 15 can be placed on top of the grill in the V-configuration 30 by inserting the two sets of grill-plate tabs 21a, 21b into grill plate holes 25a, 25b, 25c, 25d in the surface of the grill plate 15. (FIG. 14). In this embodiment the long sides of the grill plate 15 rest on the upper horizontal edges of the long sides of the inverted long-side panels 11a, 11b, and the short sides of the grill plate 15 rest on the upper long side edge of the short-side panels 12a, 12b.

Figure 12:
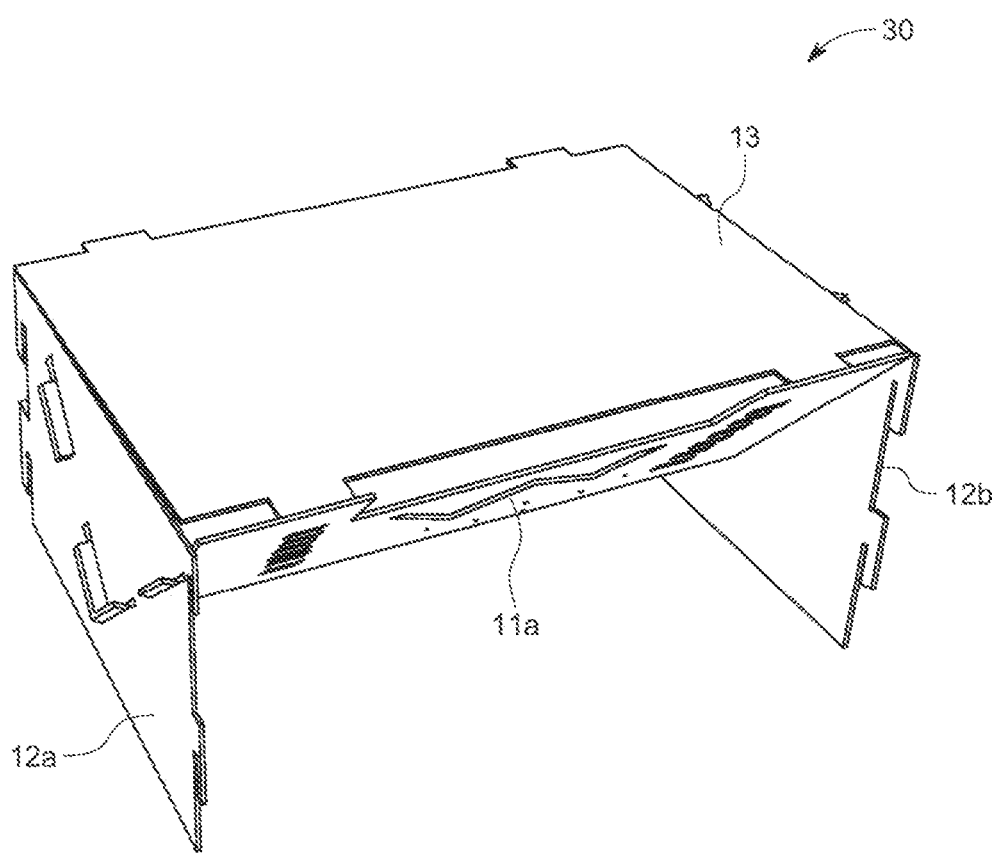
FIG. 12 is an alternate view of the V-configuration of the grill of the present invention.

In an alternate embodiment, the ash plate 13 can be placed on the grill in the V-configuration 30 to form a flat cooking surface (similar to a griddle) suitable for such foods as eggs, pancakes or bacon. (FIG. 12). In this embodiment the short side edges of the ash plate 13 rest on the upper long side edge of the short-side panels 12a, 12b.

Figure 15:
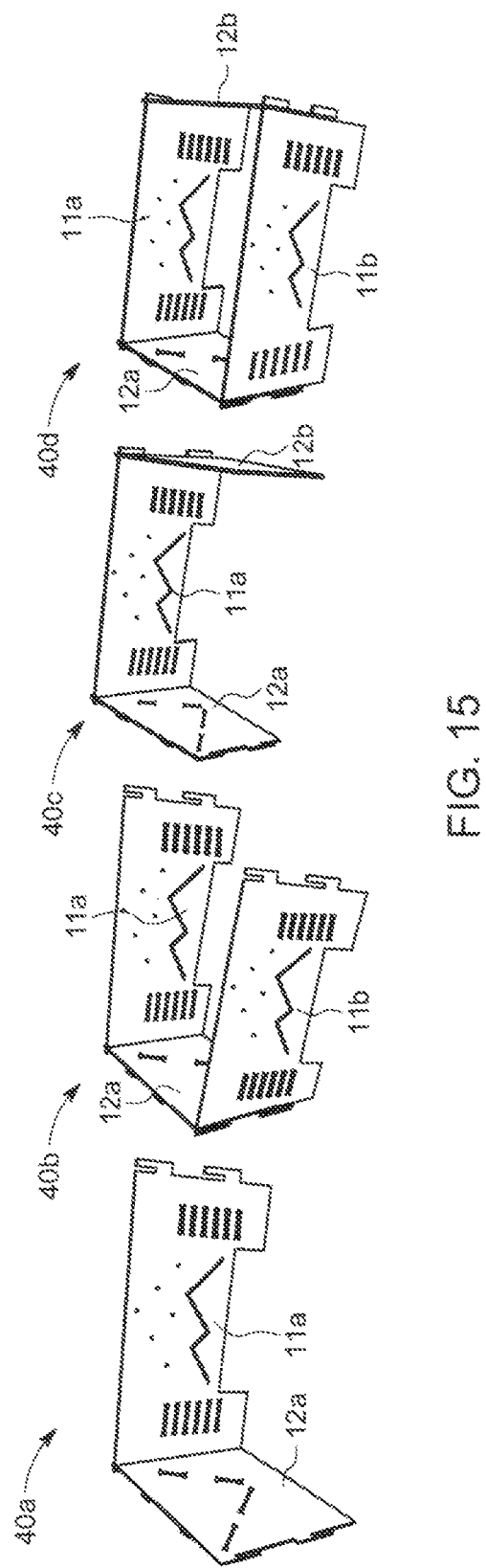
FIG. 15 are alternate views of the windscreen formation of the present invention.

FIG. 15 shows embodiments of the present invention in a windscreen formation 40a, 40b, 40c, 40d. Windscreen formation 40a includes two components: a short-side panel 12a and a long-side panel 11a. These two components are joined as per the engagement in the primary configuration 10 via the interlocking or engagement of the short-side panel U-shaped tabs 19a, 19b with the long-side panel U-shaped tabs 17a, 17b. (FIG. 15, 40a).

Windscreen formation 40b includes three components: one short-side panel 12a; and two long-side panels 11a, 11b. These three components are joined as per the engagement in the primary configuration 10 via the interlocking or engaging of two sets of the long-side panel U-shaped tabs 17a, 17b with the short-side panel U-shaped tabs 19a, 19b, 19c, 19d (FIG. 15, 40b).

Windscreen formation 40c includes three components: two short-side panels 12a, 12b and one long-side panel 11a. These three components are joined as per the engagement in the primary configuration 10 via the interlocking or engagement of two sets of the short-side panel U-shaped tabs 19a, 19b and the long-side panel U-shaped tabs 17a, 17b, 17c, 17d. (FIG. 15, 40c).

Windscreen formation 40d includes four components: two short-side panels 12a, 12b and two long-side panels 11a, 11b. The four components are joined as per the engagement in the primary configuration 10 via the engagement or interlocking of the short-side panel U-shaped tabs 19a, 19b, 19c, 19d and the long-side panel U-shaped tabs 17a, 17b, 17c, 17d. (FIG. 15). This formation is similar to the primary grill formation 10 without the ash plate 13, perforated plate 14, and grill plate 15. (FIG. 15, 40d).

The component panels and plates of the present invention can be prepared from various heat-proof components. Examples of possible materials include various metals. Preferably the component panels and plates are prepared from metallic materials such as food safe grades of stainless steel or titanium. Other suitable metals include various other high heat resistant and bio compatible alloys.

To enable the collapsible, portable, and modular nature of the present invention the component pieces are generally prepared within set ratios/dimensions of each other. Particularly, the long side of the long-side panels (not including tabs), grill plate (not including the grill plate handles), ash plate and perforated plate are approximately the same length. Embodiments of the long sides of these components are between 100 mm and 600 mm, preferably 200 mm and 400 mm, and most preferably between 250 mm and 350 mm. In one embodiment the long sides of the ash plate and perforated plate are 300 mm in length, the long side of the long-side panel is 320 mm inclusive of the long-side panel tabs, and the long side of the grill plate is 381 mm inclusive of the grill plate handles.

The length (vertical height in the upright configuration) of the short side of the long-side panels (including the feet) and the length (vertical height in the upright configuration) of the short side of the short-side panels (not including the grill plate tabs) are approximately the same in length. In embodiments these lengths are between 50 mm and 400 mm, preferably between 100 mm and 300 mm, and most preferably between 120 and 200 mm. In one embodiment the length of the short side of the long-side panel is 160 mm, and the length of the short-side of the short-side panel, inclusive of the grill plate tabs is 163 mm.

The length (horizontal length when in the upright configuration) of the long side of the short-side panels, and the length (width when placed in a horizontal position, otherwise short side length) of the short sides of the ash plate, perforated plate and grill plate, are approximately the same in length (excluding the ash plate tabs and perforated plate tabs). In embodiments these lengths are between 75 mm and 500 mm, preferably between 100 mm and 300 mm, and most preferably between 150 mm and 250 mm. In one embodiment the length of the short side of the long-side panel, inclusive of tabs, and the short sides of the ash and perforated plates, inclusive of tabs is 220 mm, and the length of the short side of the grill plate is 200 mm.

The tabs, including the U-shaped tabs generally have a long side length of between 20 mm and 80 mm, preferably between 30 mm and 50 mm, and most preferably about 40 mm for the side panels and 30 mm for the plates, and a short side length (inclusive of the slot cut out on the side panels) of between 2.5 mm and 20 mm, preferably between 5 mm and 15 mm, and most preferably about 10 mm. The slots on the long-side panels and diagonal slots on the short-side panels are large enough to easily engage the tabs.

The width (vertical height when laid flat) of the plates and panels of the present invention is between 0.5 mm and 5 mm, preferably between 1 mm and 3 mm, and most preferably about 1.5 mm.

The handles of the grill plate can be of varying length, shape and size. Certain embodiments will have rectangular handles with a short side length of between 20 mm and 60 mm, preferably between 20 mm and 40 mm and most preferably about 30 mm, and a long side length of between 60 mm and 150 mm, preferably between 80 mm and 120 mm and most preferably about 100 mm.

The grill plate tabs can be any shape, length or size in accordance with the dimensions of the present invention. In certain embodiments the grill plate tabs are rectangular or square with a long side (horizontal length in upright configuration) between 2 mm and 7 mm, preferably between 3 mm and 6 mm and most preferably about 5 mm; and a short side (the vertical height of the tab in upright configuration) between 1 mm and 5 mm preferably between 2 mm and 4 mm, and preferably about 3 mm. The accompanying grill plate holes are designed to firmly hold the grill plate tabs.

Air vents can be located in the flat surface of the long-side panels and the short-side panels. The air vents are configured to increase air flow to the fuel compartment of the grill. The size, shape and number of the air vents can be varied depending on the artistic desire and the air flow necessities of the grill. Preferred embodiments include a plurality of air vents. A preferred design for air vents for the present invention can be seen in FIGS. 1-9.

The long-side panels slots and the diagonal short-side panels slots are generally rectangular. In preferred embodiments, the slots are generally rectangular with an enlarged opening on the terminating end of the slot to ease insertion. The enlarged opening can be circular, square, triangular, or diamond shaped. As an example, the slots on the long-side panels and short-side panels in FIGS. 1-9 have generally triangular terminating ends that are wider than the center of the slot. The central portions of the slot are generally larger than the tabs of the engaging components, and configured to hold the engaging tabs.

As will be evident from the dimensions of the components of the preferred embodiments of the present invention, when all components are stacked flat they can be placed in a container, package, bag, and/or carrying case that is between 760 mm×440 mm×20 mm and 190 mm×110 mm×5 mm, and preferably moderately larger than 381 mm×220 mm×10.5 mm.

Example 1

The primary embodiment of the present invention is described as follows:

The components of the grill are prepared from titanium by laser cutting, computer numerical control cutting, and/or waterjet cutting.

Two long-side panels with a long side length (horizontal length) of 320 mm (300 mm plus 10 mm tabs on each end), a short side length (vertical height) of 160 mm (including the feet) and a width of 1.5 mm. The feet of the long-side panels are approximately 40 mm in height and 70 mm in length. The long-side panel slots are approximately 30 mm in length and about 2 mm in height. The long-side panels have 6 horizontal long-side panel slots in two vertical rows, wherein each row is located between the short side vertical edge of the long-side panel and the vertical edge of the foot. In the present embodiment, the long-side panel further has air vents in a decorative pattern, forming mountains and stars. There are four long-side panel U-shaped tabs (2 on each short side) extending lengthwise from the short side edges (vertical edge) of the long-side panels. The long-side panels U-shaped tabs are 40 mm in height and 10 mm in length (using the same designations as used for height and length of the panel in the upright configuration) with a cut-out to form the U-shape of about 20 mm. The cut-out of the long-side panel U-shaped tab faces towards the upper horizontal edge (upper long side) of the long-side panels. The upper edge of the long side of the upper long-side panel U-shaped tab is aligned with the upper edge of the long side of the long-side panel. The lower edge of the lower long-side panel U-shaped tab is approximately 40 mm from the lower corner of the long side of the long-side panel, and approximately at the upper edge of the foot of the long-side panel.

Two short-side panels with a long side length (horizontal length) of 220 mm (200 mm plus 10 mm tabs on both sides), a short side length (vertical height) of 163 mm (inclusive of two 3 mm×5 mm grill plate tabs approximately 65 mm from each short side edge), and a width of 1.5 mm. There are four diagonal short-side panel slots on each short-side panel which are approximately 40 mm in length and about 2 mm in height. There are four short-side panel U-shaped tabs (2 on each short side) on each vertical edge (height) of the short-side panel that are 40 mm in height and 10 mm in length (using the same designations as used for height and length of the panel in the upright configuration) with a 20 mm cut-out to form the short-side panel U-shape. The cut-out of the short-side panel U-shaped tab faces toward the lower horizontal edge (long side/length) of the short-side panels. The upper edge of the long side of the upper short-side panel U-shaped tab is aligned with the upper corner of the short-side panel. The lower edge of the lower short-side panel U-shaped tab is approximately 40 mm from the lower horizontal edge of the short-side panel.

The ash plate is 300 mm on its long side, 200 mm on its short side, and has a width of 1.5 mm. The long side of the ash plate has four rectangular tabs (two on each long side) that are approximately 30 mm by 10 mm (length by width, in the horizontal upright configuration). The ash plate tabs are located on the long side of the ash plate approximately 30 mm from the corner of the ash plate. The ash plate is flat with no holes or perforation.

The perforated plate is 300 mm on its long side, 200 mm on its short side, and has a width of 1.5 mm. The long side of the perforated plate has four rectangular tabs (two on each long side) that are approximately 30 mm by 10 mm (length by width, in the horizontal upright configuration). The perforated plate tabs are located on the long side of the perforated plate approximately 30 mm from the corners of the perforated plate. The perforated plate is flat with 49 equally spaced round holes to allow biomass debris to pass onto the ash plate or onto the ground below the grill 10.

The grill plate is 317 mm on its long side, 200 mm on its short side, and has a width of 1.5 cm. The handles of the grill plate are approximately 101 mm in length (long side of handle) by 31 mm in length (short side of handle). The handles are centered on the short side of the grill plate. The grill plate has two parallel rows of approximately 22 grill slots that are approximately 70 mm by 6 mm. The grill slots are separated from the long side by 19 mm and separated from each parallel row by 19 mm (19 mm×70 mm×19 mm×70 mm×19 mm). The grill plate further has two grill plate holes along the short side of the grill plate approximately 56 mm from the corner of the grill plate and aligned with the short length of the handles.

The two short-side panels are configured to be engaged or interlocked with the long-side panels via the U-shaped tabs that slide into engagement with each other. This forms a rectangular frame as seen in FIG. 15, at 40*d*.

A method for assembling the preferred embodiment of the grill begins with engaging the ash plate into the long-side panel slots of a first long-side panel followed by engaging the perforated plate into the long-side panel slots of the first long-side panel. Next, the second long-side panel is engaged with the ash plate and the perforated plate. Next, the short-side panel U-shaped tabs are engaged with the long-side panels U-shaped tabs. Finally, the grill plate is placed on top of the grill and grill plate tabs of the short-side panels are inserted into the grill plate holes of the grill plate.

Example 2

The size, shape and dimension of the components as described in Example 1 are employed in Example 2 below. Two long-side panels are inverted and engaged between the two short-side panels via engagement of the long-side panel tabs and the diagonal short-side panel slots. In this configuration the long-side panels are in a diagonal alignment in which the feet of the long-side panels are towards the top of the grill in the V-configuration. The long-side panels form an approximately 86-degree wedge. The wedge acts as the collection area or fuel compartment for the biomass for the grill. Optionally, the ash plate, grill plate or a cooking utensil can be placed on top of the grill in the V-configuration. (FIGS. 10-12 and 14). When using the ash plate, the short side edges of the ash plate rest on the long side edges of the short-side panels. When using the grill plate, the short side edge of the grill plate rests on the long side edge of the short-side panels and the grill plate tabs of the short-side panel are engaged with the grill plate holes of the grill plate.

Example 3

The size, shape and dimension of the components as described in Example 1 are employed in Example 3 below. A windscreen can be prepared from the components of the present invention by joining, interlocking or engaging the following combinations of components:
  A. One long-side panel and one short-side panel (FIG. 15, 40*a*);
  B. Two long-side panel and one short-side panels (FIG. 15, 40*b*);
  C. One long-side panels and one short-side panel (FIG. 15, 40*c*); and
  D. Two long-side panels and two short-side panels (FIG. 15, 40*d*).

All of the above configurations are prepared by engaging the short-side panel tabs with the long-side panel tabs as described in Example 1.

The foregoing description and examples have been set forth merely to illustrate the present invention and are not intended to be limiting. Since modifications of the described embodiments incorporating the spirit and substance of the invention may occur to persons skilled in the art, the invention should be construed broadly to include all variations within the scope of this application, including but not limited to the appended claims and equivalents thereof.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e, methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein. The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples. The Applicant reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A collapsible, portable, and modular grill comprising:
   (a) a long-side panel, wherein the long-side panel comprise a long side and a short side, wherein the long side panel further comprises long-side panel tabs and a plurality of long-side panel slots, wherein the long-side panel tabs extend lengthwise from the short side of the long-side panel; and
   (b) a short-side panel, wherein the short-side panel comprises a long side and a short side, wherein the short-side panel further comprises short-side panel tabs, diagonal short-side panel slots and grill plate tabs, wherein the short-side panel tabs extend lengthwise from the short side of the short-side panel, and the grill plate tabs extend lengthwise from an edge of the long side of the short-side panel;
   wherein the long-side panel is configured to engage the short-side panel via the long-side panel tabs and the short-side panel tabs to form a two-sided windscreen.

2. The collapsible, portable, and modular grill according to claim 1 further comprising a second short-side panel engaged with said long-side panel to form a three-sided windscreen.

3. The collapsible, portable, and modular grill according to claim 1 further comprising a second long-side panel engaged with said short-side panel to form a three-sided windscreen.

4. The collapsible, portable, and modular grill according to claim 3 further comprising a second short-side panel engaging with said second long-side panel and said first long-side panel to form a four-sided rectangular box without a top or bottom.

5. A collapsible, portable, and modular grill comprising:
   (a) two long-side panels, wherein the long-side panels comprise a long side and a short side, wherein the long side panels further comprise long-side panel tabs and a plurality of long-side panel slots, wherein the long-side panel tabs extend lengthwise from the short side of the long-side panels; and
   (b) two short-side panels, wherein the short-side panels comprise a long side and a short side, wherein the short-side panels further comprise short-side panel tabs, diagonal short-side panel slots and grill plate tabs, wherein the short-side panel tabs extend lengthwise from the short side of the short-side panels, the grill plate tabs extend lengthwise from an edge of the long side of the short-side panels,
   wherein the long-side panels and the short-side panels are configured to be engaged via the long-side panel tabs and the diagonal short-side panel slots to form a V configuration; wherein the short-side panels are parallel to each other in a vertical alignment and the long-side panels form a V configuration at an angle of 70-110 degrees.

6. The collapsible, portable, and modular grill according to claim 5 further comprising a bottom plate, the bottom plate comprising four bottom plate tabs; wherein the bottom plate is configured to be placed on the grill to form a cooking surface.

7. The collapsible, portable, and modular grill according to claim 5 further comprising a grill plate; the grill plate comprising a long side and a short side, a plurality of grill slots, grill plate holes, and two grill plate handles,
   wherein a first grill plate handle extends lengthwise from a short side edge of the grill plate, and a second grill plate handle extends lengthwise from an opposite short side edge of the grill plate,
   wherein the grill plate is configured to be placed on the grill to form a cooking surface, and
   wherein the grill plate is configured to be engaged with the long side of the short-side panels via engagement of the grill plate holes on the grill plates and the grill plates tabs on the edge of the long side of the short-side panels.

8. The collapsible, portable, and modular grill according to claim 7 wherein the panels and plates are configured to be disassembled, stacked flat, and stored in a container that is 1-30% longer than a length of the grill plate inclusive of the grill plate handles, 1-30% wider than a short side length of a bottom plate inclusive of the bottom plate tabs, and 500-2000% higher than a width of the plates or panels.

9. A collapsible, portable, and modular grill comprising:
   (a) two long-side panels, wherein the long-side panels comprise a long side and a short side, wherein the long-side panels further comprise long-side panel tabs and a plurality of long-side panel slots, wherein the long-side panel tabs extend lengthwise from the short side of the long-side panels;
   (b) two short-side panels, wherein the short-side panels comprise a long side and a short side, wherein the short-side panels further comprise short-side panel tabs, diagonal short-side panel slots and grill plate tabs, wherein the short-side panel tabs extend lengthwise from the short side of the short-side panels, and the grill plate tabs extend lengthwise from an edge of the long side of the short-side panels;
   (c) a bottom plate, wherein the bottom plate comprises a short side and a long side, wherein the bottom plate comprises bottom plate tabs configured to engage with the long-side panel slots, and wherein the bottom plate tabs extend lengthwise from the long side of the bottom plate; and
   (d) a grill plate, wherein the grill plate comprises a long side and a short side, wherein the grill plate comprises a plurality of grill slots, and grill plate holes;
   wherein the two long-side panels and the two short-side panels are configured to be engaged via the long-side panel tabs and the short-side panel tabs to form a four-sided box;
   wherein the bottom plate is configured to be engaged with the long-side panels via the bottom plate tabs and the long-side panel slots to form a five-sided box;
   wherein the five-sided box comprises a fuel compartment configured to hold fuel for the grill; and
   wherein the grill plate is configured to be engaged with the long side of the short-side panels via engagement of the grill plate holes on the grill plates and the grill plates tabs on the edge of the long side of the short-side panels to form a six-sided box.

10. The collapsible, portable, and modular grill according to claim 1 wherein a length of the long side of the long-side panel, a length of the long side of the bottom panel, and a length of the long side of the grill plate is between 100 mm and 600 mm.

11. The collapsible, portable, and modular grill according to claim 10 wherein the length of the long side of the long-side panel, the length of the long side of the bottom panel, and the length of the long side of the grill plate is between 250 mm and 350 mm.

12. The collapsible, portable, and modular grill according to claim 1 wherein a length of the short side of the long-side panel, and a length of the short side of the short-side panel is between 50 mm and 400 mm.

13. The collapsible, portable, and modular grill according to claim 12 wherein the length of the short side of the long-side panel, and the length of the short side of the short-side panel is between 120 mm and 200 mm.

14. The collapsible, portable, and modular grill according to claim 1 wherein a length of the long side of the short-side panel, and a length of the short side of the bottom panel is between 75 mm and 500 mm.

15. The collapsible, portable, and modular grill according to claim 14 wherein the length of the long side of the short-side panel, and the length of the short side of the bottom panel is between 150 mm and 250 mm.

16. The collapsible, portable, and modular grill according to claim 1, wherein the grill plate further comprises two grill plate handles, wherein a first grill plate handle extends lengthwise from a short side edge of the grill plate, and a second grill plate handle extends lengthwise from an opposite short side edge of the grill plate.

17. The collapsible, portable, and modular grill according to claim 16 wherein the panels and plates are configured to be disassembled, stacked flat, and stored in a container that is 1-30% longer than a length of the grill plate inclusive of the grill plate handles, 1-30% wider than a short side length of a bottom plate inclusive of the bottom plate tabs, and 500-2000% higher than a width of the plates or panels.

18. The collapsible, portable, and modular grill according to claim 1, where the bottom plate is an ash plate, and wherein the ash plate does not include any holes or perforations.

19. The collapsible, portable, and modular grill according to claim 1, wherein the bottom plate is a perforated plate, and wherein the perforated plate comprises a plurality of ash holes.

20. The collapsible, portable, and modular grill according to claim 1, wherein the long side panels further comprises air vents configured to increase airflow to the fuel compartment of the grill.

* * * * *